(12) United States Patent
Gaard et al.

(10) Patent No.: US 9,679,691 B2
(45) Date of Patent: Jun. 13, 2017

(54) WIND TURBINE TRANSFORMER ARRANGEMENT

(71) Applicant: SIEMENS AKTIENGESELLSCHAFT, München (DE)

(72) Inventors: Jesper Gaard, Odense S (DK);
Thorkil Munk-Hansen, Give (DK);
Jacob Blach Nielsen, Engesvang (DK);
Carsten K. Rasmussen, Flemming (DK)

(73) Assignee: SIEMENS AKTIENGESELLSCHAFT (DE)

( * ) Notice: Subject to any disclaimer, the term of this patent is extended or adjusted under 35 U.S.C. 154(b) by 100 days.

(21) Appl. No.: 14/319,243

(22) Filed: Jun. 30, 2014

(65) Prior Publication Data
US 2015/0070869 A1    Mar. 12, 2015

(30) Foreign Application Priority Data
Sep. 12, 2013    (EP) .................................... 13184177

(51) Int. Cl.
| | | |
|---|---|---|
| *H01F 27/10* | (2006.01) | |
| *H01F 27/08* | (2006.01) | |
| *H01F 27/14* | (2006.01) | |
| *H01F 27/12* | (2006.01) | |
| *H01F 27/02* | (2006.01) | |
| *F03D 80/80* | (2016.01) | |

(52) U.S. Cl.
CPC .............. *H01F 27/14* (2013.01); *F03D 80/82* (2016.05); *H01F 27/025* (2013.01); *H01F 27/125* (2013.01)

(58) Field of Classification Search
CPC .................................................... F03D 11/0058
USPC ...................................................... 336/57, 58
See application file for complete search history.

(56) References Cited

U.S. PATENT DOCUMENTS

| | | |
|---|---|---|
| 2,622,122 A | 12/1952 | Lennox |
| 2,639,308 A | 5/1953 | Egger |
| (Continued) | | |

FOREIGN PATENT DOCUMENTS

| | | |
|---|---|---|
| EP | 2166545 A2 | 3/2010 |
| WO | WO 2010069315 A2 | 6/2010 |

OTHER PUBLICATIONS

Enlgish translation JP359072708A.*
Extended Search Report for European Appln. No. 13184177.7, mailed on Nov. 15, 2013.

*Primary Examiner* — Elvin G Enad
*Assistant Examiner* — Ronald Hinson
(74) *Attorney, Agent, or Firm* — Schmeiser Olsen & Watts LLP

(57) ABSTRACT

An improved transformer arrangement of a wind turbine is provided. A wind turbine transformer arrangement comprises a transformer that is arranged in the wind turbine. The transformer comprises a housing. The transformer housing is filled with an oil. The transformer arrangement comprises at least one decompression chamber and the interior of the transformer housing is connected to the interior of the decompression chamber by a pressure release tube in a way that an increase in the pressure in the transformer housing due to a malfunction of the transformer is transferred through the pressure release tube into the decompression chamber.

17 Claims, 2 Drawing Sheets

(56) References Cited

U.S. PATENT DOCUMENTS

Figure 1:
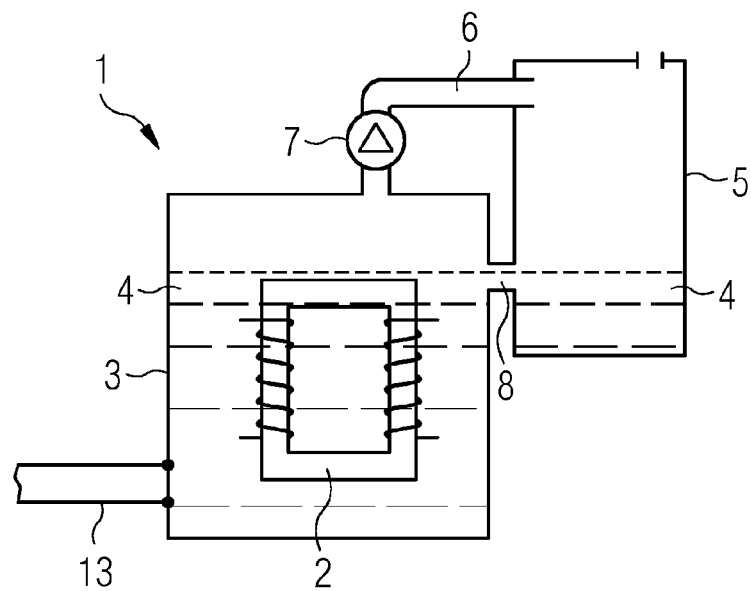

| | | | |
|---|---|---|---|
| 3,934,453 A | 1/1976 | Hessen | |
| 7,049,922 B2 * | 5/2006 | Sabau | H01F 27/14 336/55 |
| 8,416,042 B2 * | 4/2013 | Schwaiger | F03D 11/00 336/55 |
| 2013/0058070 A1 * | 3/2013 | Gaard | F03D 11/0058 361/836 |

* cited by examiner

WIND TURBINE TRANSFORMER ARRANGEMENT

CROSS-REFERENCE TO RELATED APPLICATIONS

This application claims priority to EP Application No. 13184177.7, having a filing date of Sep. 12, 2013, the entire contents of which are hereby incorporated by reference.

FIELD OF TECHNOLOGY

The following relates to an improved transformer arrangement of a wind turbine.

BACKGROUND

A wind turbine commonly comprises a rotor, a nacelle and a tower. The rotor is typically attached so as to be rotatable to the nacelle and the nacelle is ordinarily arranged on top of the tower. An electric generator is usually connected to the nacelle of the wind turbine.

The wind interacts with the rotor of the wind turbine and rotates the rotor. The rotation of the rotor is transferred to the electric generator where the rotational energy is transformed into electrical energy.

The electrical energy of the generator is generally transformed by a transformer to a certain predetermined voltage level.

It is therefore known to arrange a transformer within the nacelle or the tower of the wind turbine.

Short-circuits can occur in the transformer that lead to an electric arc. The electric arc can lead to a rapid local temperature increase that again leads to a vaporization of material, like oil, in the transformer. This vaporization can lead to a pressure increase in the transformer that may cause the transformer housing to rupture and release the pressure. This is known as an explosion of a transformer.

The explosion of a transformer can present several negative effects, for example the transformer may be damaged and the oil present in the transformer may be released into the surrounding area. When people are present in the surrounding of the transformer, an explosion can be a severe safety problem.

Several measures are known to avoid these negative effects, for example the transformer may be arranged in a special transformer housing to guide the pressure wave and the spilled oil into a predetermined direction of the transformer that is equipped with an explosion tight housing.

This presents further disadvantages in that the transformer still gets damaged due to the explosion of that the housing, which is very heavy and not very service friendly.

SUMMARY

An aspect relates to an improved transformer arrangement.

The aspect is reached by the subject matter according to the independent claim. Preferred embodiments of the invention are described in the dependent claims.

A wind turbine transformer arrangement comprises a transformer that is arranged in the wind turbine. The transformer comprises a housing. The transformer housing may be at least partially filled with an oil.

The transformer arrangement may comprise at least one decompression chamber and the interior of the transformer housing may be connected to the interior of the decompression chamber by a pressure release tube in a way that an increase in the pressure in the transformer housing due to a malfunction of the transformer may be transferred through the pressure release tube into the decompression chamber.

The wind turbine may comprise an electrical transformer to transform the voltage level of the electrical power from the electrical generator into a certain predetermined voltage. The transformer can be arranged in the nacelle of the wind turbine or in the tower of the wind turbine.

The transformer may comprise a housing that is filled with an oil. The oil may be used as an insulation in the transformer housing and/or as a cooling medium.

A malfunction can occur in the transformer. A malfunction may lead to an electrical discharge in the transformer. The electrical discharge may lead to an increase in the local temperature in the transformer. The local increase in the temperature in the transformer may cause the oil to vaporize. The vaporized oil may lead to a high increase in the pressure inside of the housing of the transformer.

The transformer arrangement may comprise at least one decompression chamber and the interior of the transformer housing may be connected to the interior of the decompression chamber by a pressure release tube.

Thus the high pressure of the vaporized oil in the transformer housing can be released through the pressure release tube into the decompression chamber. Thus, the high pressure may be removed from the housing of the transformer and may be guided into the decompression chamber.

Thus, the housing of the transformer may not experience high pressures. Thus, damage to the housing of the transformer may be avoided.

While the housing of the transformer may be equipped with strong and rigid walls, the walls of the decompression chamber can be of a weaker material.

Thus the increase and the pressure in the housing of the transformer may not damage the housing of the transformer. The pressure from the transformer housing may be released into the decompression chamber and in the case of a very high increase of the pressure, also in the decompression chamber, the walls of the decompression chamber may deform.

Thus the housing of the transformer may stay undamaged after the increase of the pressure in the housing. Thus the oil inside of the housing of the transformer may stay inside the housing and may not leak out of the housing. Thus the danger of damage to the environment may be reduced.

In addition the transformer housing may explosion-resistant, thus the safety of personnel working in the nacelle of the wind turbine or in the tower of the wind turbine may be enhanced.

The pressure release tube may comprise a valve that may open when the pressure in the transformer housing is increasing.

The pressure release tube may connect the transformer housing with the decompression chamber. A valve may be arranged in the pressure release tube. The valve may open when the pressure in the transformer housing is increasing. The valve may open within a few milliseconds after the pressure starts to increase.

Thus, the release of the pressure from the transformer housing into the decompression chamber may be regulated by a valve.

Thus, the transformer may comprise a closed housing during normal operation and, in addition, a quick release of an increasing pressure may be possible.

The decompression chamber may be oil-tight so that oil that spills from the transformer housing to the pressure release tube and pressure is released from the transformer housing through the pressure release tube into the decompression chamber may be collected in the decompression chamber.

Oil may start to vaporize due to a malfunction in the transformer and increases of pressure in the transformer housing. The pressure in the transformer housing may be released to the pressure release tube.

In addition to vaporized oil, liquid oil might also spill through the pressure release tube into the decompression chamber.

The decompression chamber may be oil-tight so that the oil that spills through the pressure release tube can be collected in the decompression chamber.

Thus, the oil of the transformer may not released into the environment of the wind turbine. Thus, the oil of the transformer may not damage components present in the nacelle or in the tower of the wind turbine.

The decompression chamber may be at least partially filled with oil and may be connected to the transformer housing by a tube in a way that the oil can flow through the tube between the transformer housing and a decompression chamber.

The decompression chamber may be used as a compensation tank for the oil and the transformer housing to compensate varying oil levels in the transformer housing. Varying levels of the oil in the transformer housing can occur to due to different temperatures of the oil. The varying oil levels in the housing may be compensated by oil in the compensation tank.

The decompression chamber of the transformer may be used as a compensation tank for the oil. Thus, varying oil levels can be equalized and in addition no separate tank for the spare oil may be needed.

Thus, the space needed for an additional compensation tank may be saved within the tower or the nacelle of the wind turbine.

The decompression chamber that is used as a compensation tank may be connected to the housing of the transformer by a tube. The oil of the transformer housing can flow into the compensation tank and back into the housing of the transformer through the tube.

The transformer may be arranged within the tower of the wind turbine.

The transformer of the wind turbine can be arranged within an upper part or a lower part of the tower of the wind turbine.

Thus, no space in the nacelle may be needed for the transformer. Thus, space in the nacelle may be saved or can be used for other components present in the nacelle.

The transformer may be arranged within the nacelle of the wind turbine.

The electrical generator of the wind turbine may be connected to the nacelle of the wind turbine. When the transformer is arranged in the nacelle of the wind turbine a direct connection between the generator and the transformer can be established.

Thus, no special arrangement to rotate the cables leading from the nacelle into the tower, when the nacelle is rotating on top of the tower, may be needed.

In addition a transformer present in the nacelle of the wind turbine can more easily be exchanged through a hatch in the nacelle.

The nacelle may comprise a support structure. The support structure may comprise two mainly parallel bars. The two bars may be arranged mainly horizontally in the nacelle. The transformer may be connected to the bars at least at one point per bar.

A first end of a rod may be connected to the transformer at a third point. The three points may define a triangle. The second end of the rod may be attached to the support structure in a way that the vibrations of the transformer may be damped and an oscillation of the transformer may be reduced.

Thus, vibrations of the transformer may be reduced, and in addition mechanical loads and stress on the transformer may be reduced.

The transformer may be arranged mainly below the bars of the support structure.

Thus, the transformer may be more or less hanging at the bars of the support structure.

Thus, the transformer can easily be lowered by a crane out of the nacelle to the ground or onto a ship. Thus, the transformer can easily be exchanged.

An internal crane can be used for the exchange of the transformer. Thus, the costs for an external crane can be saved.

The transformer may be arranged between two bars of the support structure.

Thus, the transformer may be connected to the support structure at opposite sides of the transformer arrangement. Thus, the loads and the stress in the housing of the transformer may be reduced.

In addition, the transformer can be lowered by an internal crane out of the nacelle for an exchange.

The transformer may be a high-voltage transformer.

A high voltage transformer may be a transformer with an output voltage level of more than 1 kV. The output voltage of the transformer may be higher than 70 kV.

Thus the voltage of the generator can be transformed into a high voltage.

Thus, a connection for a high voltage and a low current may be necessary between the nacelle and the tower, or between the wind turbine and the substation.

Thus, less copper or aluminum may be needed for the cable connection.

The transformer may be connected to a cooling circuit to cool the transformer and the oil present in the transformer housing may be used as a cooling fluid.

The transformer may be connected to a cooling circuit. The cooling circuit may comprise an oil-to-water heat exchanger or the oil present in the cooling system may be guided to an oil-to-air heat exchanger at the outside of the nacelle.

Thus, the transformer may be cooled by using the oil present in the transformer. Thus, no additional cooling fluid may be needed to cool the transformer.

The wall of the decompression chamber may be more flexible than the wall of the transformer housing.

The decompression chamber may experience a plastic deformation at a lower pressure than the transformer housing. In the case of an increase in the pressure in the transformer housing the pressure may be transferred through the pressure release tube into the decompression chamber. The pressure first may cause a plastic deformation of the decompression chamber before it causes a plastic deformation of the transformer housing.

Thus, the transformer housing may not be damaged by the increase in the pressure in the housing. Thus, the transformer housing may not burst due to the increase in the pressure and release the oil present in the housing into the environment of the nacelle, of the tower, or of the wind turbine.

In addition, the safety of personnel working in the wind turbine may be increased.

BRIEF DESCRIPTION

Figure 2:
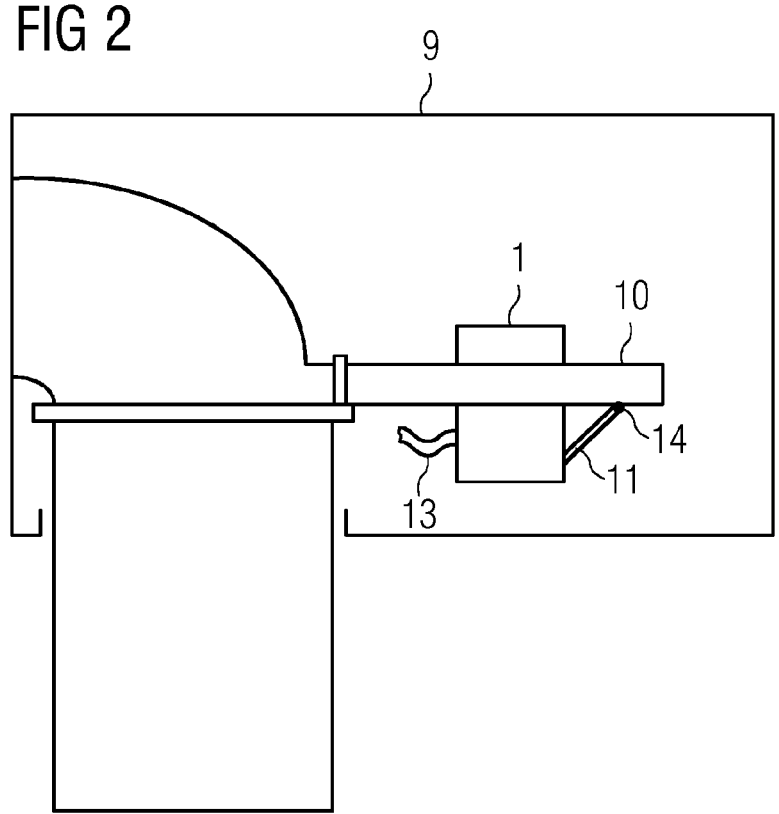
Figure 3:
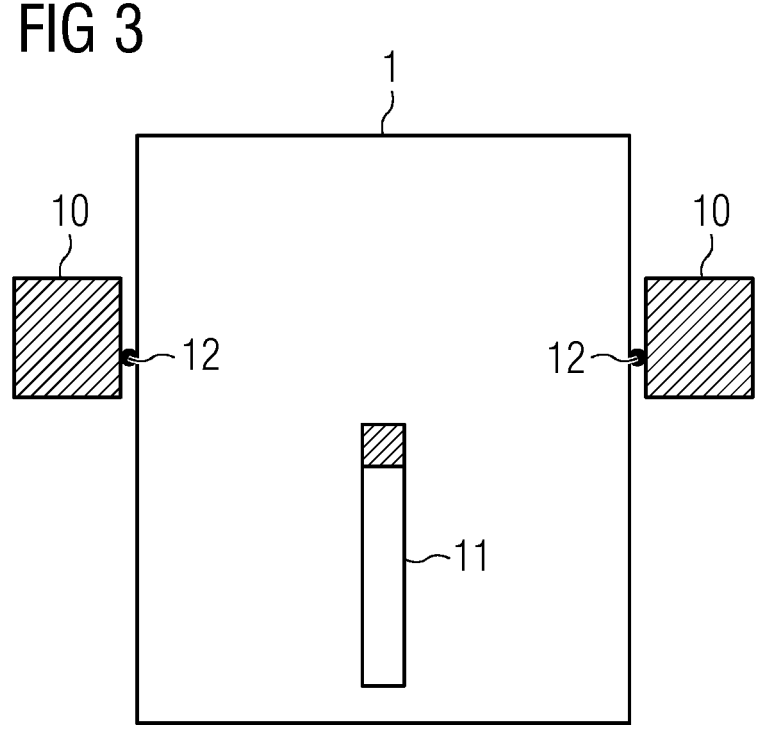
Figure 4:
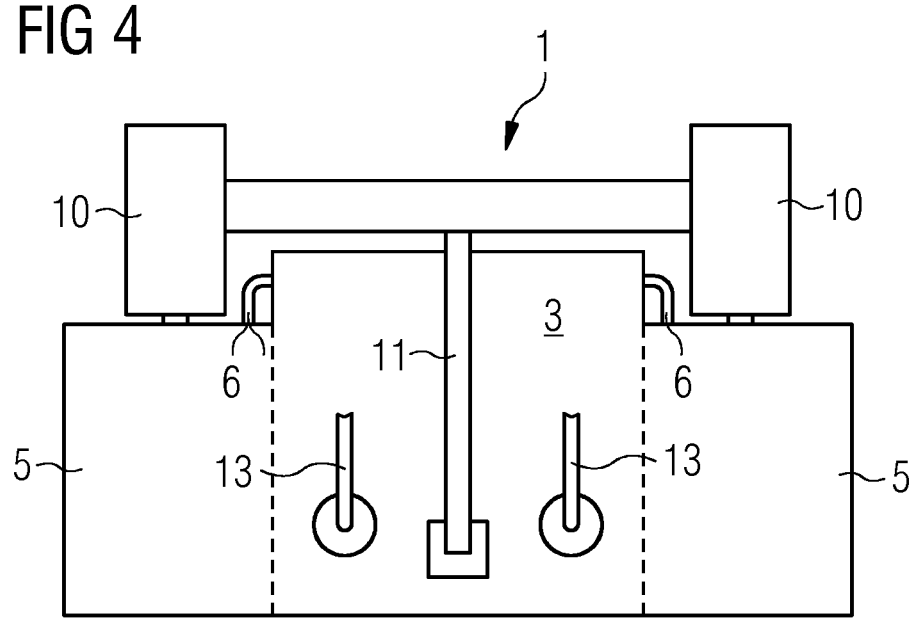

Some of the embodiments will be described in detail, with reference to the following figures, wherein like designations denote like members, wherein:

FIG. 1 shows a transformer arrangement;
FIG. 2 shows a transformer arrangement in a nacelle;
FIG. 3 shows the transformer arrangement connected to the support structure; and
FIG. 4 shows a second view of the transformer arrangement connected to the support structure.

DETAILED DESCRIPTION

FIG. 1 shows a transformer arrangement 1 that comprises a transformer 2 that is arranged within a housing 3.

The housing 3 comprises oil 4 that is used as an insulation and cooling medium. The housing 3 comprises a connection 13 to connect the transformer arrangement 1 to a cooling circuit.

A decompression chamber 5 is connected to the housing 3 via a pressure release tube 6. The pressure in the housing 3 might increase rapidly due to a malfunction of the transformer 2. A malfunction of the transformer 2 could be an insulation problem that leads to sparking in the transformer. The sparking in the transformer leads to a vaporization of the oil 4 in the housing 3. The vaporization of the oil 4 in the housing 3 leads to an increase of the pressure in the housing 3.

If the housing 3 were a closed housing the rapid increase and the pressure within the housing would lead to a damage of the housing. In the transformer arrangement 1 the high pressure within the housing 3 is transferred through the pressure release tube 6 into the decompression chamber 5.

The walls of the housing 3 are more rigid than the walls of the decompression chamber 5. Thus, the decompression chamber 5 would experience a plastic deformation in the case of a very high and rapid increase of the pressure within the housing 3. The plastic deformation of the decompression chamber 5 occurs before the housing 3 experiences any plastic deformation.

The pressure release tube 6 comprises a valve 7 that opens within milliseconds after the start of the increase of the pressure in the housing 3.

During the release of the pressure from the housing 3 into the decompression chamber 5 vaporized oil and droplets of the oil 4 are forced through the pressure release tube 6 into the decompression chamber 5. The spilled oil and droplets of oil can collect in the decompression chamber 5.

In the transformer arrangement 1 the decompression chamber 5 is also used as a compensation tank. Therefore the housing 3 and the decompression chamber 5 are connected via a tube 8. The oil level within the transformer housing 3 could vary due to temperature influences. The level of the oil 4 within the housing 3 can be compensated by the spare oil 4 in the decompression chamber 5. The oil in the decompression chamber 5 can flow through the tube 8 into the housing 3.

FIG. 2 shows a transformer arrangement 1 that is arranged within the nacelle 9 of a wind turbine.

The nacelle 9 of the wind turbine comprises a support structure 10 and the transformer arrangement 1 is connected to the support structure 10. In addition a rod 11 is arranged between the transformer arrangement 1 and the support structure 10. A first end of the rod 11 is connected to the transformer arrangement 1, and a second end of the rod 11 is connected to the support structure at a connection point 14.

FIG. 3 shows the transformer arrangement 1 that is connected to the support structure 10 at connection points 12.

In addition a rod 11 is connected to the transformer arrangement 1 at a first end of the rod 11. The second end of the rod 11 is then connected to the support structure 10. Thus, the transformer arrangement 1 is connected to the support structure 10 at three points.

The support structure 10 comprises two bars and the transformer arrangement 1 is arranged between the two bars of the support structure 10.

In FIG. 3 the transformer arrangement 1 is connected to the support structure 10 in a way that the main part of the transformer arrangement 1 is arranged below the support structure 10. Thus, the transformer arrangement 1 is hanging between the two bars of the support structure 10.

Thus, the transformer arrangement 1 can easily be disconnected from the support structure 10 and can be lowered down out of the nacelle by a crane for repair or replacement.

FIG. 4 shows the transformer arrangement 1 that is connected to the support structure 10.

The transformer arrangement 1 comprises a housing 3 and two decompression chambers 5 arranged at opposite sides of the housing 3. The housing 3 and the decompression chambers 5 are connected via a pressure release tube 6.

The housing 3 comprises a connection 13 to a cooling system. The transformer arrangement 1 is connected to a support structure 10 in the nacelle of a wind turbine.

In FIG. 4 the transformer arrangement 1 is hanging below the support structure 10. In addition, a rod 11 is connected with its first end to the housing 3 of the transformer arrangement 1. The second end of the rod 11 is connected to the support structure 10.

Thus, the transformer arrangement 1 is connected to the support structure 10 at three points. Thus, stress and vibrations in the transformer arrangement 1 are minimized.

In addition, the transformer arrangement 1 can easily be detached from the support structure 10 and can be lowered out of the nacelle of the wind turbine through a hatch. An internal crane can be used to lower the transformer arrangement out of the nacelle for repair or replacement.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A wind turbine transformer arrangement comprising:
   a transformer arranged in a transformer housing, the transformer housing being filled with an oil; and
   at least one decompression chamber partially filled with oil and connected to the transformer by a tube, wherein the oil of the transformer housing flows into the at least one decompression chamber and back into the transformer housing through the same tube positioned between the transformer and the at least one decompression chamber;

wherein an interior of the transformer housing is connected to an interior of the at least one decompression chamber by a pressure release tube in a way that an increase in a pressure in the transformer housing, due to a malfunction of the transformer, is transferred through the pressure release tube into the at least one decompression chamber;

wherein the transformer housing is arranged in a nacelle of the wind turbine, and connected to a support structure of the nacelle, the support structure of the nacelle being two mainly parallel bars of the nacelle, further wherein the transformer housing is connected to the two mainly parallel bars at connections points such that the transformer housing hangs between the two mainly parallel bars of the support structure of the nacelle.

2. The arrangement according to claim 1, wherein the pressure release tube comprises a valve that opens when the pressure in the transformer housing is increasing.

3. The arrangement according to claim 1, wherein the at least one decompression chamber is oil tight, so that oil that spills from the transformer housing through the pressure release tube, when pressure is released from the transformer housing through the pressure release tube into the at least one decompression chamber, is collected in the at least one decompression chamber.

4. The arrangement according to claim 1, wherein the at least one decompression chamber is used as a compensation tank for the oil in the transformer housing to compensate varying oil levels in the transformer housing.

5. The arrangement according to claim 1, wherein
the two mainly parallel bars are arranged mainly horizontal in the nacelle,
whereby the transformer is connected to the two mainly parallel bars at least at one point per bar,
whereby a first end of a rod is connected to the transformer at a third point,
whereby the three point define a triangle,
whereby the second end of the rod is attached to the support structure in a way that the vibrations of the transformer are damped and an oscillation of the transformer is reduced.

6. The arrangement according to claim 5, wherein the transformer is arranged mainly below the two mainly parallel bars of the support structure.

7. The arrangement according to claim 1, wherein the transformer is a high voltage transformer.

8. The arrangement according to claim 1, wherein the transformer is connected to a cooling circuit to cool the transformer and that the oil present in the transformer housing is used as a cooling fluid.

9. The arrangement according to claim 1,
whereby a wall of the at least one decompression chamber is more flexible than a wall of the transformer housing,
so that the at least one decompression chamber experiences a plastic deformation at a lower pressure than the transformer housing,
so that, in the case of an increase in the pressure in the transformer housing, the pressure that is transferred through the pressure release tube into the at least one decompression chamber first causes a plastic deformation of the at least one decompression chamber before it causes a plastic deformation of the transformer housing.

10. A wind turbine transformer arrangement comprising:
a transformer arranged in a transformer housing, the transformer housing being filled with an oil; and
at least one decompression chamber, wherein an interior of the transformer housing is connected to an interior of the at least one decompression chamber by a pressure release tube in a way that an increase in a pressure in the transformer housing is transferred through the pressure release tube into the at least one decompression chamber;
wherein the at least one decompression chamber is at least partially filled with spare oil and is connected to the transformer housing by a tube in a way that the spare oil can flow through the tube between the transformer housing and the at least one decompression chamber, so that the at least one decompression chamber is used as a compensation tank for the oil in the transformer housing to compensate varying oil levels in the transformer housing;
wherein the oil of the transformer housing flows into the at least one decompression chamber and back into the transformer housing through the same tube positioned therebetween.

11. The wind turbine transformer arrangement of claim 10, wherein an oil level within the transformer housing is equalized to a spare oil level in the at least one decompression tank.

12. The wind turbine transformer arrangement according to claim 10, wherein the pressure release tube comprises a valve that opens when the pressure in the transformer housing is increasing.

13. The wind turbine transformer arrangement according to claim 10, wherein the at least one decompression chamber is oil tight, so that oil that spills from the transformer housing through the pressure release tube, when pressure is released from the transformer housing through the pressure release tube into the at least one decompression chamber, is collected in the at least one decompression chamber.

14. The wind turbine transformer arrangement according to claim 10, wherein two mainly parallel bars are arranged mainly horizontal in a nacelle,
whereby the transformer is connected to the two mainly parallel bars at least at one point per bar,
whereby a first end of a rod is connected to the transformer at a third point,
whereby the three point define a triangle,
whereby the second end of the rod is attached to a support structure of the nacelle in a way that the vibrations of the transformer are damped and an oscillation of the transformer is reduced.

15. The wind turbine transformer arrangement according to claim 14, wherein the transformer is arranged mainly below the two mainly parallel bars of the support structure.

16. The wind turbine transformer arrangement according to claim 10, wherein the transformer is connected to a cooling circuit to cool the transformer and that the oil present in the transformer housing is used as a cooling fluid.

17. The wind turbine transformer arrangement according to claim 10,
whereby a wall of the at least one decompression chamber is more flexible than a wall of the transformer housing,
so that the at least one decompression chamber experiences a plastic deformation at a lower pressure than the transformer housing,
so that, in the case of an increase in the pressure in the transformer housing, the pressure that is transferred through the pressure release tube into the at least one decompression chamber first causes a plastic deformation of the at least one decompression chamber before it causes a plastic deformation of the transformer housing.

* * * * *

UNITED STATES PATENT AND TRADEMARK OFFICE
CERTIFICATE OF CORRECTION

PATENT NO. : 9,679,691 B2  
APPLICATION NO. : 14/319243  
DATED : June 13, 2017  
INVENTOR(S) : Jesper Gaard et al.

It is certified that error appears in the above-identified patent and that said Letters Patent is hereby corrected as shown below:

In the Claims

Column 7, Line 17 (Claim 1, Line 23), please change "connections points" to --connection points--

Column 8, Line 46 (Claim 14, Line 8), please change "three point" to --three points--

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*